(12) United States Patent
Bignon-Zillhardt et al.

(10) Patent No.: US 9,099,852 B2
(45) Date of Patent: Aug. 4, 2015

(54) TOOL FOR STRIPPING ELECTRIC CABLES

(71) Applicant: STANLEY WORKS (Europe) GmbH, Dubendorf (CH)

(72) Inventors: Julian Bignon-Zillhardt, Viry Chatillon (FR); Yi Tung Chan, Taichung (TW); Chihchiang Lee, Taichung (TW)

(73) Assignee: Stanley Works (Europe) GmbH (CH)

( * ) Notice: Subject to any disclaimer, the term of this patent is extended or adjusted under 35 U.S.C. 154(b) by 240 days.

(21) Appl. No.: 13/916,970

(22) Filed: Jun. 13, 2013

(65) Prior Publication Data

US 2013/0333224 A1      Dec. 19, 2013

(30) Foreign Application Priority Data

Jun. 14, 2012  (FR) ..................... 12 01706

(51) Int. Cl.
*B21F 13/00* (2006.01)
*H02G 1/12* (2006.01)

(52) U.S. Cl.
CPC ........... *H02G 1/1204* (2013.01); *H02G 1/1224* (2013.01); *H02G 1/1217* (2013.01)

(58) Field of Classification Search
CPC .. H02G 1/1204; H02G 1/1224; H02G 1/1217
USPC ................................ 30/90.1–91.2
See application file for complete search history.

(56) References Cited

U.S. PATENT DOCUMENTS

| | | | | |
|---|---|---|---|---|
| 2,391,722 A * | 12/1945 | Lundeen | ........................ | 30/90.9 |
| 2,548,977 A * | 4/1951 | Jaeger | ............................ | 30/90.9 |
| 3,620,104 A * | 11/1971 | Horrocks | ........................ | 30/90.1 |
| 3,810,307 A * | 5/1974 | Mongredien | .................. | 30/90.1 |
| 3,869,791 A * | 3/1975 | Horrocks | ........................ | 30/90.1 |
| 5,377,410 A * | 1/1995 | Welch | ............................. | 30/90.1 |
| 5,956,852 A * | 9/1999 | Tarpill | ............................ | 30/90.3 |
| 6,018,873 A * | 2/2000 | McClellan | ...................... | 30/90.4 |
| 6,334,253 B1 * | 1/2002 | Cheng | ............................. | 30/90.7 |
| 6,477,776 B1 * | 11/2002 | Jee | ................................... | 30/90.1 |
| 6,530,152 B1 * | 3/2003 | Christensen et al. | .......... | 30/90.1 |
| 6,581,291 B1 * | 6/2003 | Tarpill et al. | .................... | 30/90.4 |
| 7,958,803 B2 * | 6/2011 | Chiu | ................................. | 81/9.4 |
| 7,984,553 B1 * | 7/2011 | Miller et al. | ..................... | 30/90.1 |
| 2004/0045165 A1 * | 3/2004 | Russell | ........................... | 30/91.2 |
| 2004/0055160 A1 * | 3/2004 | Ducret | ............................ | 30/90.1 |
| 2006/0242839 A1 * | 11/2006 | Landes et al. | .................. | 30/90.4 |

(Continued)

FOREIGN PATENT DOCUMENTS

| | | |
|---|---|---|
| DE | 102007032399 | 9/2008 |
| FR | 2818039 | 6/2002 |

OTHER PUBLICATIONS

Search report dated Jan. 31, 2014 of the European Patent Office for related patent application No. EP13171370.3.

*Primary Examiner* — Sean Michalski
(74) *Attorney, Agent, or Firm* — Richard J. Veltman; Adan Ayala (57) ABSTRACT

The tool comprises a body (2); a cable support head connected to the body; a knife holder supporting a cable sheath incision knife (8), the cutting portion (9) of the knife (8) being capable of extending beyond the knife holder. The knife holder (7) receives a socket (34) supporting the incision knife (8), and a clip (36) arranged so as to be movable inside the socket (34). The clip (36) is provided with a locking/unlocking opening intended to interact with a groove (102) arranged on the shaft (100) of the knife (8).

10 Claims, 5 Drawing Sheets

(56) References Cited

U.S. PATENT DOCUMENTS

| | | | |
|---|---|---|---|
| 2007/0199197 A1* | 8/2007 | Schmode et al. | 30/90.1 |
| 2008/0271255 A1 | 11/2008 | Frazer | |
| 2013/0007964 A1* | 1/2013 | Liu | 7/107 |
| 2013/0133203 A1* | 5/2013 | Stocklein | 30/90.4 |
| 2015/0082639 A1* | 3/2015 | Tews et al. | 30/90.8 |
| 2015/0089815 A1* | 4/2015 | Woodward | 30/90.1 |

* cited by examiner

Fig.2

TOOL FOR STRIPPING ELECTRIC CABLES

The present invention relates to a tool for stripping electric cables, the tool being of the type comprising a body; a cable support head which is connected to the body; a knife holder supporting a cable sheath incision knife, the cutting portion of the knife being capable of extending beyond the knife holder.

BACKGROUND OF THE INVENTION

In the field of industrial maintenance it is usual to act on cables covered with a sheath, in order to eliminate a portion of this sheath by a stripping operation. However, the cutting member is subjected to wear which means that it must be changed periodically.

It is known from FR-A1-2 818 039 to use a tool to cut the outer layer of insulation from an elongated cable. The tool comprises a body which holds a cable incision knife which projects from a knife holder, as well as a member for moving the cable towards the knife. The body is equipped with a device for rapid adjustment of the projection height of the knife from the knife holder. The knife is provided with a circular groove in which a split ring maintains the knife in an axial position in the device. However, with this device it is not possible to change the incision knife rapidly.

SUMMARY OF THE INVENTION

According to one aspect, an object of the invention is to make it easier to change the knife of the tool of the above-mentioned type.

To this end, the invention relates to a tool of the above-mentioned type, the knife holder of which receives a socket supporting the incision knife, and a clip arranged so as to be movable inside the socket, the clip being provided with a locking/unlocking opening intended to interact with a groove arranged on the shaft of the knife.

The knife is thus kept locked in relation to the socket by means of a releasably securable clip which acts on the shaft of the knife.

More particularly, it is provided that
the groove is arranged at the end of the knife opposite the cutting portion;
the knife holder receives the socket in a sliding manner to adjust the projection height of the knife from the knife holder;
the knife holder receives a knob such that said knob can rotate relative to the knife holder, which knob is provided with an internal tapping which acts on an external thread of the socket in order to displace it in a sliding manner;
the knife holder comprises passages are adapted to act on the clip from outside the knife holder.

According to another aspect, an object of the invention is to improve the design of the stripping tool by improving the placement of the cable in the support head.

This problem is solved by the fact that, in a cable stripping tool of the above-mentioned type, the elongated body which extends along a longitudinal axis X-X is further provided with a recess delimiting a cable support head; the knife holder is further received in a sliding manner in relation to the body substantially along the longitudinal axis X-X and comprises a free end arranged in the recess, facing the support head, beyond which end the cutting portion of the knife extends; and the tool further comprises a biasing means which acts on the knife holder to displace it towards the support head; a gripping means which is rigidly connected to the knife holder for maneuvering it; the knife holder being movable between an advanced position in which the incision knife is moved closer to the support head under the action of the biasing means and a retracted position in which the incision knife is moved away from the support head against the action of the biasing means, the gripping means being arranged adjacent to the free end of the knife holder and comprising a bearing face adapted to receive the cable to be engaged in the support head.

The invention thus ensures rapid placement of the cable in the cable support, the tool also being ergonomic and simple to produce.

According to other features:
the bearing face is oriented in relation to the longitudinal axis X-X such that a force F applied to the cable in a direction substantially transverse to the sliding direction of the knife holder acts on the knife holder with an axial force component $F1x$ capable of displacing the knife holder from its advanced position towards its retracted position against the action R of the biasing means;
the gripping means is arranged so as to project laterally, at least in part, from the support head, and in that the bearing face is inclined in relation to the longitudinal axis X-X of the body, laterally from the end of the knife holder towards the end of the body opposite the head, moving away from the longitudinal axis X-X, the inclination being between 45° and 90°, preferably 65°.

According to another aspect, an object of the invention is to improve the safety during an operation for stripping an electrical conductor. This problem is solved by the fact that, in a tool of the type indicated above, the tool further comprises a retractable cutting blade, pivotally articulated to the body at the opposite end from the support head, the blade being movable between a rest position in which it is closed, retracted inside the body, and a working position in which it is open, completely extended from the body, and in that the body further comprises a channel which is transverse in relation to the axis X-X and intended to receive an electrical conductor, the cutting portion of the blade interfering in the profile of the channel in order to strip the conductor when the blade is in a virtually closed position.

The tool thus prevents risks of cutting the user and allows rapid circumferential cutting of the conductor, the tool also being ergonomic and simple to produce.

According to another feature,
an opening member locks the blade in a completely open position, extracted from the body.

BRIEF DESCRIPTION OF THE DRAWINGS

The invention and the advantages thereof will be better understood upon reading the following description which is given merely by way of example and with reference to the appended drawings, in which.

DETAILED DESCRIPTION OF THE DRAWINGS

The terms "lower", "upper", "right" and "left", "top" and "bottom" used in the following description are understood according to the orientation of FIG. 3 to 5*c*.

Figure 1:
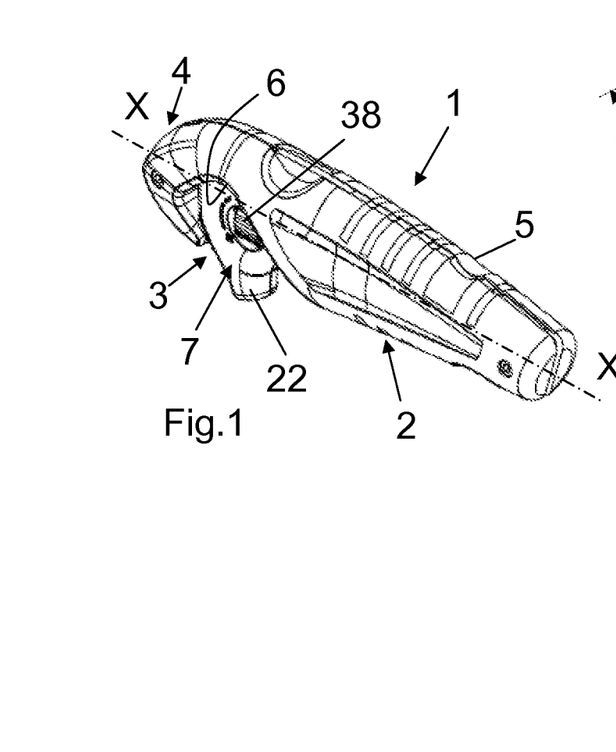
FIG. 1 is a perspective view of a tool according to the invention.
Figure 2:
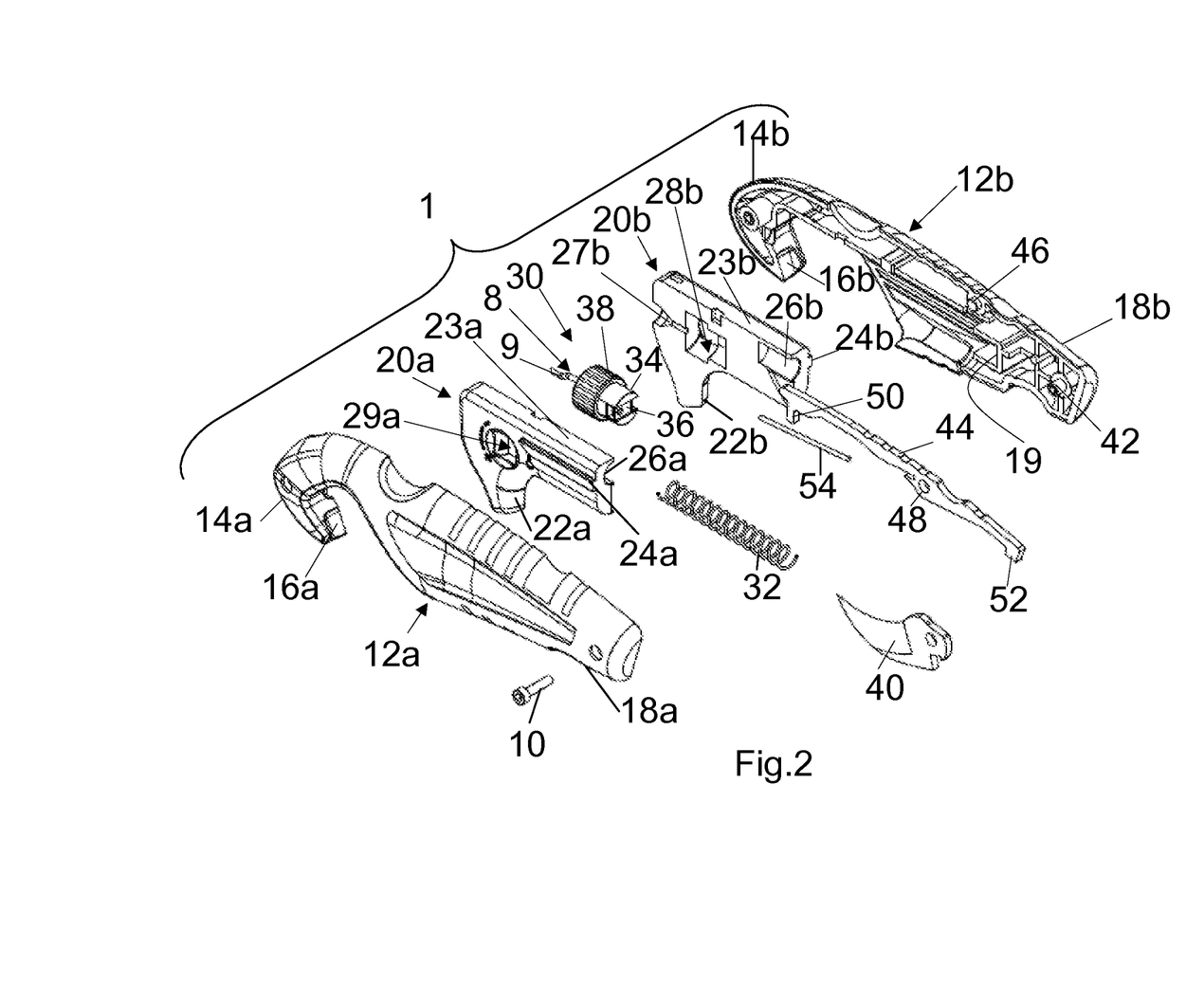
FIG. 2 is an exploded perspective view of the tool from FIG. 1.
Figure 3:
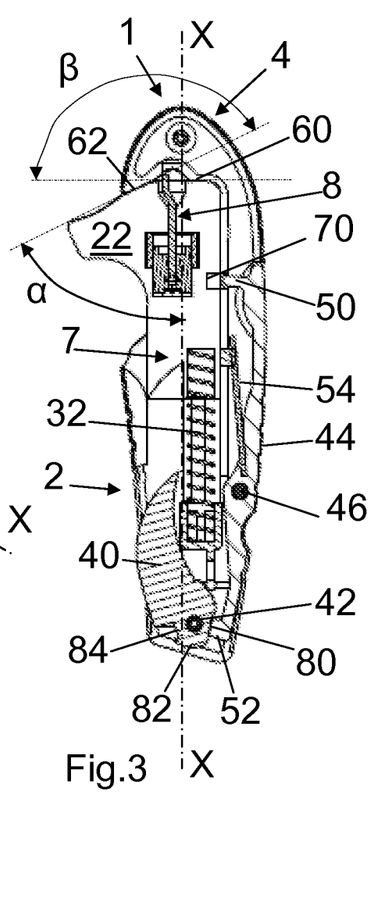
FIGS. 3 and 4 are longitudinal sectional views of the tool from FIG. 1, respectively showing the tool provided with an auxiliary cutting blade in a retracted and an extended position according to the invention.

FIGS. 1 and 2 show a particularly ergonomic and compact manual cable stripping tool. "Cable stripping tool" is understood to mean a cutting tool for stripping or unsheathing, that is to say removing the insulating covering, of a conductor, in particular of an electric cable.

The tool 1 comprises an elongated body 2 which extends along a longitudinal axis X-X and is provided with a recess 3 delimiting a support head 4 connected to a casing 5 forming a handle. A connecting portion 6 forms a constriction between the head 4 and the handle 5. A knife holder 7, on which a cable sheath incision knife 8 (FIG. 2) is mounted, is received in a sliding manner in the body 2 along the axis X-X. The head 4 and the knife holder 7 are thus in movement relative to one another. The cutting end 9 (FIG. 2) of the knife 8 is S-shaped.

Figure 5A:
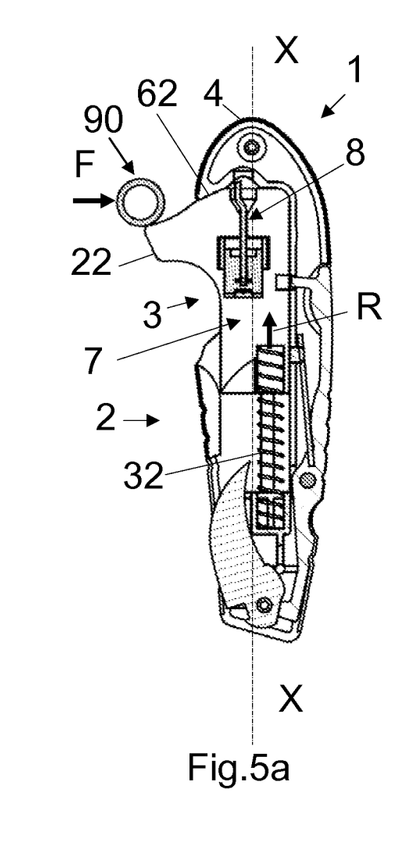
FIG. 5*a* to 5*c* are longitudinal sectional views of the tool from FIG. 1, showing the operation of the tool according to the invention and the placement of a cable.
Figure 5B:
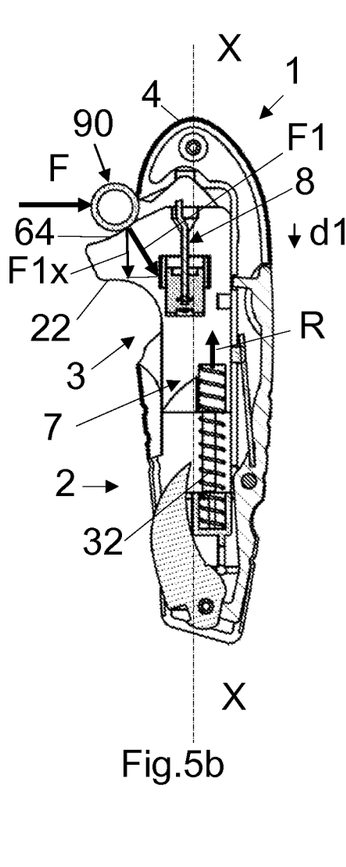
Figure 5C:
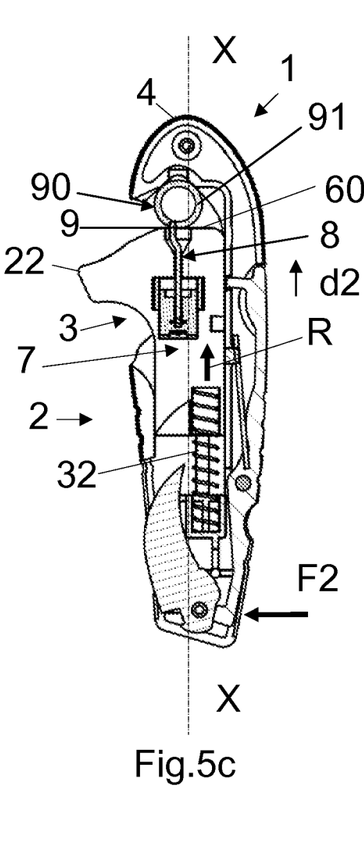

The body 2 is in the form of two shells 12*a* and 12*b* which are assembled by a screw 10. The shells are advantageously obtained by moulding a plastics material, respectively in one piece, which has the advantage of reducing the costs of production. Hook-shaped portions 14*a* and 14*b* form the support head 4 once they are assembled. The portions 14*a* and 14*b* respectively have a V-shaped inner form 16*a* and 16*b* which is capable of receiving a cable 90 (FIG. 5*a* to 5*c*). The portions 18*a* and 18*b* of the shells 12*a* and 12*b* opposite the hooks 14*a* and 14*b* form, once the shells are assembled, the gripping handle 5 of the tool. The gripping portion 18*b* comprises on the internal face a stop 19, the function of which will be described below.

Figure 8A:
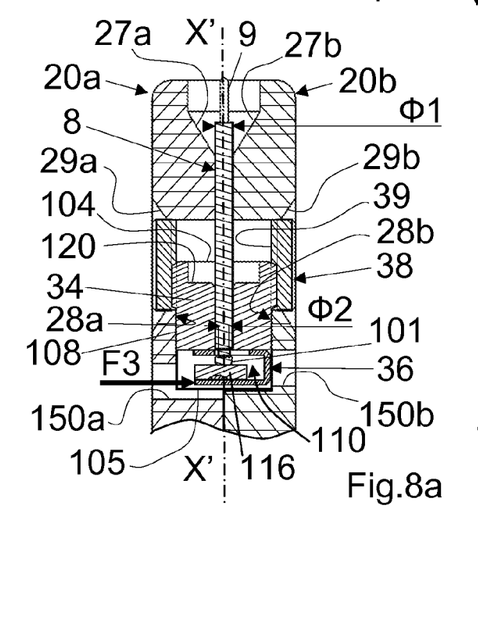
FIG. 8*a* is a sectional view in the direction of the arrows VIII in FIG. 3, showing the knife of the sub-assembly from FIG. 6 in the locked state.

The knife holder 7 of the tool is in the form of two other, L-shaped shells 20*a* and 20*b* which are assembled by appropriate means. They respectively comprise a lateral branch 22*a* and 22*b*, forming a projection 22 once the shells are assembled, and a longitudinal branch 23*a* and 23*b*, provided with an external rib 24*a* and 24*b* for sliding guidance along the axis X-X of a semi-circular inner housing 26*a* and 26*b*. The shells 20*a* and 20*b* respectively comprise an inner cavity 27*a* (FIG. 8*a*) and 27*b* (FIGS. 2 and 8*a*) in the shape of a half-funnel. The inner cavities are intended to receive the cutting portion 9 of the knife 8 in a rotatable manner. An inner recess 28*a* (FIG. 8*a*) and 28*b* (FIGS. 2 and 8*a*) respectively extend each of the inner cavities 27*a* and 27*b*. The inner recesses 28*a* and 28*b* respectively open externally into an opening 29*a* (FIGS. 2 and 8*a*) and 29*b* (FIG. 8*a*). When the shells 20*a* and 20*b* are assembled, the inner recesses are adapted to receive, by way of complementary shapes, an incision sub-assembly 30 comprising the knife 8.

A biasing means 32 of high rigidity, in the form of a helical compression spring, moves the knife holder 7 towards and clamps it in relation to the support head 4. For this purpose, the spring 32 rests on one hand on the base of the housings 26*a* and 26*b* of the knife holder 7 and on the other hand on the internal stop of the shell 12*b* of the body 2. The knife holder 7 is thus continuously biased towards the support head 4.

The incision sub-assembly 30 basically comprises a socket 34 which is provided with an external thread 35 (FIG. 8*c*) and supports the knife 8. A clip 36 releasably secures the knife 8 in relation to the socket 34. A knob 38 for adjusting the knife 8 comprises an internal tapping 39 (FIGS. 6 and 8*c*) capable of interacting with the external thread 35 of the socket 34. Once the sub-assembly 30 has been arranged in the recesses 28*a* and 28*b* of the assembled shells 20*a* and 20*b*, the knob 38 is movable only in rotation in relation to an axis of rotation parallel to the axis X-X. The knob 38 is arranged in the openings 29*a* and 29*b* (FIG. 8*a*) of the knife holder 7 and is thus accessible manually from outside the knife holder 7. A screwing or unscrewing action on the knob 38 causes the axial sliding of the socket 34. Consequently, the height of the cutting portion 9 of the knife 8 which is extracted from the knife holder 7 can easily be adjusted by an external action on the knob 38.

The tool also comprises at least one auxiliary cutting blade 40, pivotally articulated to a pin 42 rigidly connected to the body 2 at the opposite end from the support head 4, and a member 44 for opening the blade 40, articulated to another pin 46 rigidly connected to the body 2. The auxiliary blade 40 is used for cutting work more commonly performed by the user.

Figure 4:
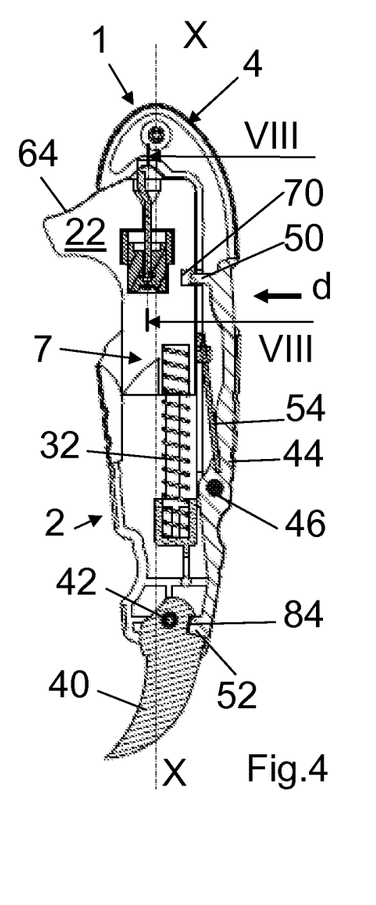

The blade 40 is movable in a retractable manner between a rest position in which it is closed, retracted inside the body 2 (FIGS. 3 and 5*a* to 5*c*) and a working position in which it is open, completely extended from the body 2 substantially in the longitudinal axis X-X (FIG. 4).

The main portion of the member 44 comprises a bore 48 capable of receiving the pin 46. The ends of the member 44 respectively comprise a first hook 50 and a second hook 52, the functions of which will be described below. A spring leaf 54 connected to the body 2 and to the member 44 resiliently biases the member 44.

In FIGS. 3, 4 and 5*a* to 5*c*, the tool 1 is shown with the body 2 oriented substantially vertically, the support head 4 at the upper end of the body 2, the lateral projection 22 of the knife holder 7 on the left, the pin 42 at the lower end of the body, the auxiliary cutting blade 40 on the left in the closed position and the member 44 for opening the blade 40 on the right.

The upper portion of the knife holder 7 comprises an upper free end 60, beyond which the cutting portion 9 of the knife 8 extends. The face of the end 60 is substantially perpendicular to the longitudinal axis X-X. The projection 22 extends from the face of the end 60 in the direction transverse to the longitudinal axis X-X of the body 2.

The projection 22 is arranged, at least in part, in the recess 3 of the body 2 and extends laterally leftwards beyond the body 2. Said projection comprises an upper bearing face 62 which is inclined in relation to the longitudinal axis X-X, laterally from the free end 60 towards the end of the body 2 opposite the head 4, moving away from the axis X-X. The angle of inclination α between the face 62 and the longitudinal axis X-X is between 45° and 90°, preferably 65°, such that the angle of inclination β between the faces 60 and 62 is between 135° and 180°, preferably 155°.

The projection 22 constitutes a gripping means which is rigidly connected to the knife holder 7 for maneuvering it. This gripping means is arranged adjacent to the free end 60 of the knife holder 7. Depending on the grip of the operator, the inclined bearing face 62 of the projection 22 is easily accessible by the index finger or the thumb of the hand which holds the body 2. A concave region 64 of large radius is formed in the portion of the face 62 which permanently extends laterally beyond the body 2.

This arrangement improves the ergonomics of the grip of the index finger or thumb.

In addition, the concave region 64 of the bearing face 62 is particularly well adapted for receiving a cable 90 (FIG. 5a to 5c) to be engaged in the inner forms 16a and 16b in the shape of an upside down V of the support head 4.

This has the advantage of providing the operator with a tool which is practical to use.

When the longitudinal branches 23a and 23b of the knife holder 7 are assembled, the knife holder 7 comprises, in the main portion thereof and on the lateral face thereof opposite the projection 22, a blind hole 70 adapted to receive the upper hook 50 of the member 44 for opening the auxiliary cutting blade 40.

While the blade 40 is at rest in the body 2, the lower hook 52 directed towards the pin 42 presses, under the action of the spring 54, on a substantially planar face 80 arranged at the end articulated at 42 of the blade 40. This firstly prevents any untimely opening of the blade 40 and secondly keeps the upper hook 50 directed towards the blind hole 70 with sufficient spacing from the hole 70 to allow the sliding of the knife holder 7 along the longitudinal axis X-X.

As soon as the blade 40 is partially displaced in rotation from the rest position, the inner hook 52 acts on a cam surface 82 which is adjacent to the flat portion 80 and arranged at the end articulated at 42 of the blade 40.

The completely open position of the blade 40 (FIG. 4) is defined by the snap-locking of the inner hook 52 in a notch 84 also arranged at the end articulated at 42 of the blade 40. The blade is then locked.

The shape of the cam surface 82 and the depth of the notch 84 are such that, under the rocking effect of the opening member 44, the upper hook 50 is engaged with the blind hole 70 when the blade 40 is extracted, at least in part, from the body 2 in the direction of the arrow d in FIG. 4.

The knife holder 7 is thus prevented from sliding along the longitudinal axis X-X when the blade 40 is partly or completely extended from the body 2, and this provides safety for the operator.

FIG. 5a to 5c show the placement of a cable in the support head of the tool.

Before the placement of the cable, the body 2 being grasped with the whole hand, the operator adjusts the projection height of the knife 8 by actuating the knob 38 at the level of the windows 29a and 29b of the knife holder 7, between the thumb and the index finger of the hand holding the body 2 or between those of the other hand.

He then positions the cable 90 to be stripped on the free end of the inclined upper face 62 of the projection 22 while applying an increasing force F substantially perpendicular to the longitudinal axis X-X (FIG. 5a).

The cable 90 slides over the concave region 64, exerting on the knife holder 7 an increasing force F1 (FIG. 5b), of which the component F1x (FIG. 5b) along the longitudinal axis X-X becomes greater than the axial reaction R of the compression spring 32. The knife holder 7 is displaced downwards, moving away from the head 4 in the direction of the arrow d1 (FIG. 5b), while the cable 90 is in abutment against the outer form of the head 4 in a configuration where there is instantaneously equilibrium of the forces present (FIG. 5b).

By substantially increasing the force F acting on the cable 90, the operator exceeds the friction forces of the edge of the head 4 acting on the cable 90. The component F1x becomes so great in relation to the reaction of the spring 32 that the knife holder 7 is displaced downwards, moving even further away from the head 4. The distance between the head 4 and the knife holder 7 is then sufficient for the cable 90 to fit and be wedged in the inner forms 16a and 16b in the shape of an upside down V of the head 4. The operator momentarily releases the force F on the cable 90 until it is cancelled, which has the result that the knife holder 7 is displaced upwards, moving closer to the head 4 in the direction of the arrow d2 under the effect of the axial reaction R of the spring 32 (FIG. 5c).

Since the knife holder 7 is continuously biased upwards, the incision knife 8 sinks into the sheath 91 (FIG. 5c) of the cable 90 until the upside down V of the head 4 centres the cable in a suitable, stable position for the cutting operations.

In a known manner, the operator then performs the circular incision of the sheath 91, pushing the lower end of the body 2 leftwards in the direction of the arrow F2 in FIG. 5c. The knife 3 is oriented such that the sheath 91 is then cut exactly at the preset depth and an additional rotation of the tool through a complete turn provides the circular cut of the sheath end to be removed.

Then, by turning his hand a quarter of a turn, the operator again grasps the body 2 with his whole hand and pulls it perpendicularly to the plane of FIG. 5c. The knife 8 then performs a longitudinal incision of the sheath end to be removed.

It should be noted that the knife 8 is mounted in a rotatable and eccentric manner in the knife holder 7, and this allows the cutting portion 9 to be oriented automatically either circumferentially or axially in relation to the cable 90 in the direction of the force exerted on the body 2.

Figure 6:
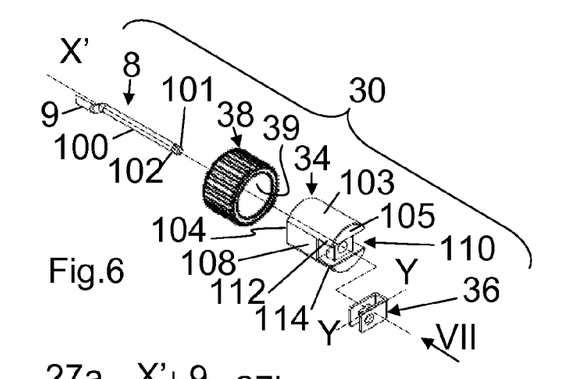
FIG. 6 is an exploded perspective view of the incision knife sub-assembly of the tool from FIG. 2.

FIGS. 6, 7a and 7b, and 8a to 8c show another aspect of the invention. In FIG. 6 the incision sub-assembly 30 extends along a longitudinal axis X'-X' substantially parallel to the axis X-X.

The knife 8 comprises, in its main portion, an elongated cylindrical shaft 100 of outer diameter φ1 (FIG. 8a). The cutting portion 9 on one hand and an end 101 opposite the cutting portion 9 on the other hand delimit the shaft 100. The end 101 is provided with a circular groove 102, the diameter φ2 of which (FIG. 8a) at the base of the groove is smaller than that of φ1.

The socket 34 comprises a generally cylindrical barrel 103 which extends along the axis X'X', delimited by a first face 104 directed towards the cutting portion 9 of the knife and a face 106 directed towards the clip 36. The socket 34 comprises two diametrically opposed flat portions 108 (only one is visible in FIG. 6) extending in mutually parallel planes which are parallel to the axis X'X'. The flat portions 108 interact with the recesses 28a and 28b by complementarity of shape and ensure the longitudinal sliding of the socket 34 in relation to the knife holder 7.

Since the thread 35 of the socket 34 corresponds to the tapping 39 of the knob 38, a rotary action on the knob 38 in relation to the axis X'-X' causes a translatory movement of the socket 34. The user can thus preset the height of the cutting portion 9 of the knife 8 which projects from the face 60 of the knife holder 7.

Figure 8B:
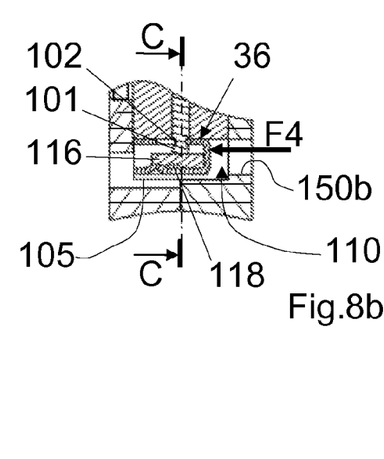
FIG. 8*b* is a partial sectional view similar to FIG. 8*a*, showing the knife of the sub-assembly from FIG. 6 in the unlocked state.
Figure 8C:
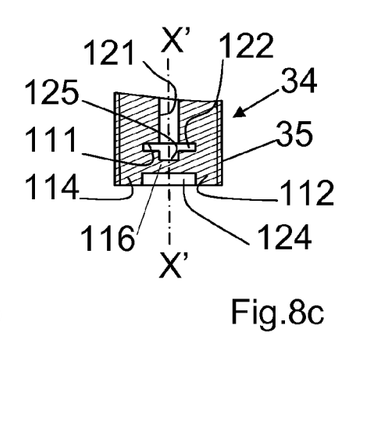
FIG. 8*c* is a partial perspective view along the line C-C in FIG. 8*b*, showing the lower recess of the socket of the sub-assembly from FIG. 6.

The socket 34 also comprises a recess 110 (FIGS. 8a and 8b) arranged transverse to the axis X'X'. The recess 110 opens at the face 106 and the flat portions 108. It delimits a base 111 (FIG. 8c) and two longitudinal wings 112 and 114 (FIGS. 6 and 8c) connected by an intermediate bar 116 (FIG. 8a to 8c). Said bar is arranged in the recess 110, perpendicular to the axis X'X', set back from the face 106 and remote from the base 111. The bar 116 is provided with a blind bore 118 (FIG. 8b) in the longitudinal axis X'-X' of the socket and on the side of the face 106.

The face 104 comprises a counterbore 120 (FIG. 8a) extended by an axial passage 121 (FIG. 8c) opening at the base 111 of the recess 110. The passage 121 receives the shaft 100 of the knife 8 in a rotatable manner.

In FIG. 8c, only the socket 34 is shown for the sake of clarity of the drawing. The bar 116 divides the recess 110 into two portions, namely a first space 122 between the base 111 and the bar 116, and a second space 124 which is open towards the face 106. A channel 125 extends perpendicularly to the axis X'-X' and receives the end 101 of the shaft 100 of the knife.

Figure 7A:
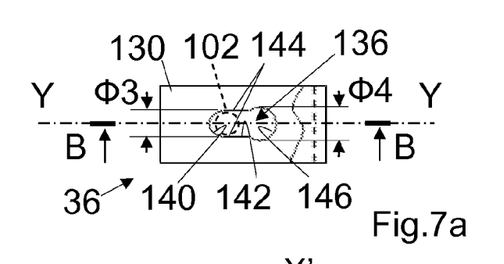
FIG. 7*a* is a plan view of the clip of the knife sub-assembly from FIG. 6 with partial cut-away and in the direction of the arrow VII in FIG. 6.
Figure 7B:
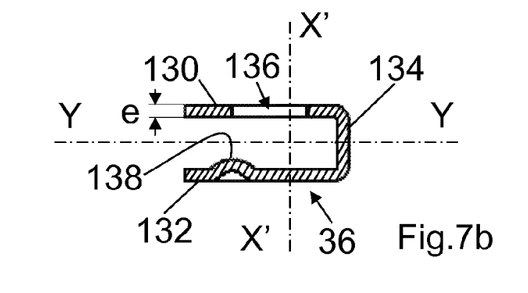
FIG. 7*b* is a sectional view of the clip from FIG. 7*a* along the line B-B.

In FIGS. 7a and 7b, the clip 36 is a part of relatively low thickness e which is folded in a U shape and, preferably, made of metal. It comprises two branches 130 and 132 connected to a central portion 134. The branches 130 and 132 are arranged in parallel planes and substantially perpendicular to the axis X'X'. The central part 134 is arranged in a plane substantially parallel to the axis X'X' and perpendicular to the planes of the branches 130 and 132.

The clip 36 is received in a sliding manner in the recess 110 in a direction perpendicular to the axis X'X'. The branch 130 is arranged in the first space 122 and comprises an opening 136 obtained by cutting (FIG. 7a). The branch 132 is arranged in the second space 124 and comprises a boss 138 oriented towards the inside of the U, that is to say the convex shape of the boss 138 is turned towards the branch 130 (FIG. 7b).

The opening 136 in the branch 130 shown in FIG. 7a extends along an axis Y-Y perpendicular to the axis X'X'. Said opening has an elongated shape in the form of a "key seat". It comprises, as shown from left to right in FIG. 7a, a first curved cut 140 through approximately 180° and of diameter φ3. The cut 140 is connected to a straight cut 142 delimited by two straight lines 144 parallel to the axis Y-Y. The width of the cut 142 is equal to the diameter φ3. A second curved cut 146 through approximately 270° and of diameter φ4, which is larger than the diameter φ3, extends the straight cut 142 towards the right.

In terms of dimensions, the diameter φ3 is smaller than the diameter φ1 and larger than the diameter φ2, while the diameter φ4 is larger than the diameter φ1. In addition, the thickness e of the branch 130 is smaller than the width of the groove 102.

The end 101 of the shaft 100 of the incision knife is thus capable of passing through the second cut 146. When the groove 102 is engaged in the opening 136, the cuts 140 and 142 are adapted to slide in the groove 102 in a relative movement substantially perpendicular to the axis X'X', a displacement along the axis X'X' being limited to the play between the thickness e of the branch 130 and the width of the groove 102.

FIG. 8a shows the clip 36 in a stable position in which it is locked relative to the knife 8, which cannot be disassembled from the socket 34.

In this position the groove 102 is engaged in the cuts 140 and 142, as shown by dashed lines in FIG. 7a, and the boss 138 is engaged in the blind bore 118 by complementarity of shape (FIG. 8a).

The shells 20a and 20b of the knife holder 7 respectively comprise a transverse passage 150a and 150b (FIGS. 8a and 8b) giving access to the clip from the outside when the shells are assembled. The passages 150a and 150b open into one another with a slight axial offset.

To obtain the position in which the knife 8 is locked in relation to the socket 34, the user firstly acts, from the outside, by turning the knob 38 so as to position the clip 36 along the longitudinal axis X'-X', facing the passages 150a and 150b, the cutting portion of the knife 8 being virtually withdrawn inside the knife holder 7.

The user then acts on the free end of the branch 132 through the passage 150a formed in the shell 20a and arranged perpendicular to the axis X'-X' by exerting a force in the direction of the arrow F3 in FIG. 8a. The groove 102 is then engaged in the first curved cut 140 and in the small straight cut 142, and this has the effect of preventing any uncoupling between the knife 8 and the clip 36 in an axial movement along the axis X'-X'.

Depending on the intensity of use of the tool, the cutting portion 9 of the knife 8 is subjected to wear over time.

To change the knife 8, the user again acts, from the outside, by turning the knob 38 so as to position the clip 36 longitudinally such that it faces the passages 150a and 150b.

He then urges the clip 36 from the locked position (FIG. 8a) towards an unlocked position (FIG. 8b) by exerting a force on the central portion 134 in the direction of the arrow F4 in FIG. 8b through the passage 150b formed in the shell 20b and arranged perpendicular to the axis X'-X'.

When the clip 36 is in the unlocked position, the boss 138 is disengaged from the blind bore 118 and the groove 102 is engaged in the curved cut 146 of large diameter, and this has the effect of allowing the uncoupling between the knife 8 and the clip 36 in an axial movement along the axis X'-X'.

It should be noted that, in the locked position, as in the unlocked position, the clip 36 is arranged entirely in the recess 110, without projecting in relation to the two flat portions 108.

The user displaces the knife holder 7 against the spring 32 and inverts the tool 1 by directing the support head 4 downwards in order to extract the knife 8 from the knife holder 7 under the effect of gravity.

A new incision knife 8 is mounted by way of the reverse operations.

Figure 9:
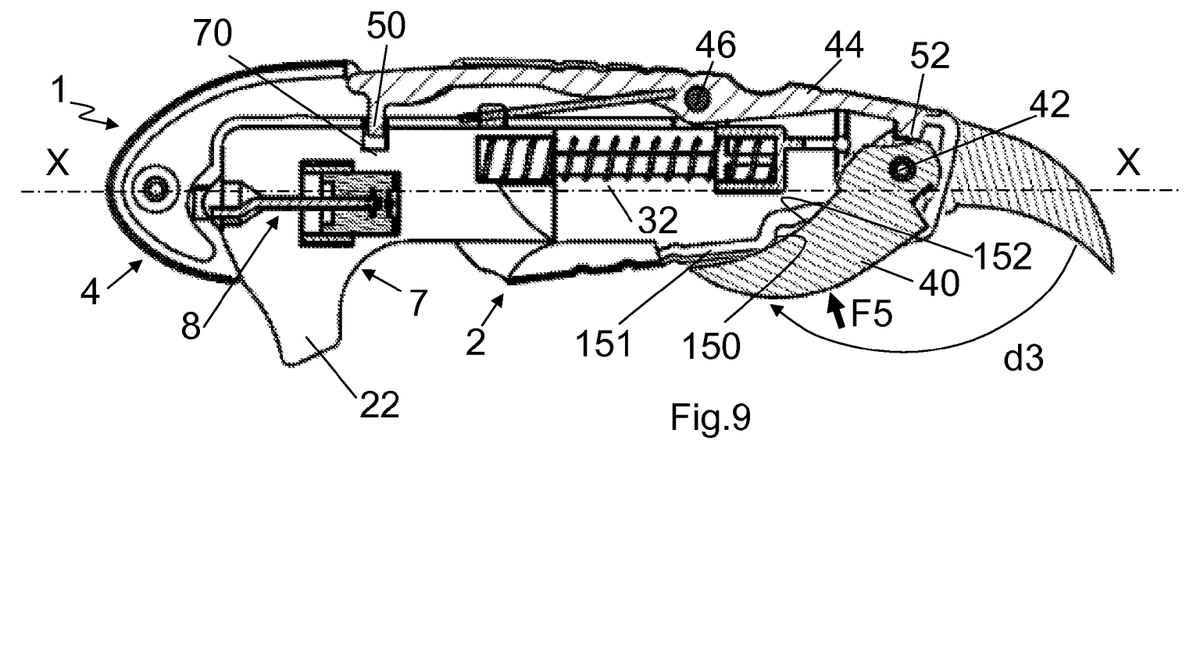
FIG. 9 is a plan view with partial cut-away of the tool from FIG. 1, showing the operation for stripping an electrical conductor using the auxiliary cutting blade.
Figure 10:
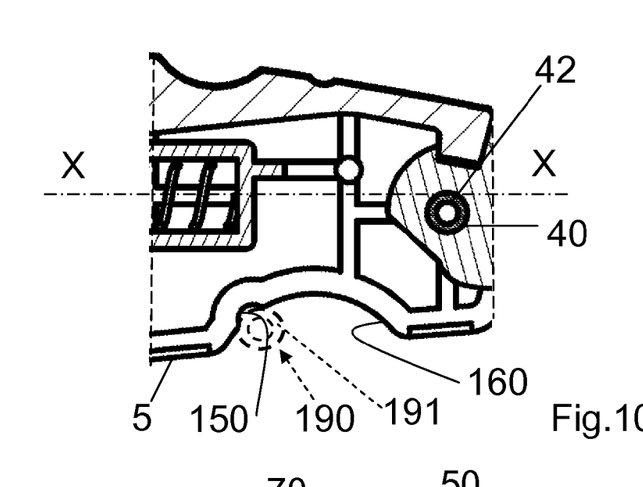
FIG. 10 is a plan view with partial cut-away on an enlarged scale, showing a detail from FIG. 9.
Figure 11:
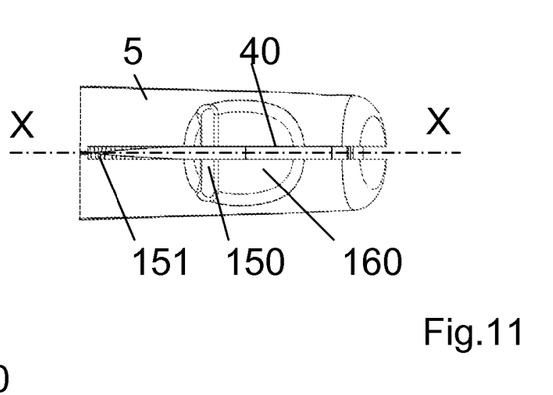
FIG. 11 is a partial view from below of the tool from FIG. 9.

FIG. 9 to 11 show a third aspect of the invention.

The tool 1 has an additional stripping means adapted to a conductor of small diameter, such as an electric wire.

For this purpose, the casing 5 forming a handle comprises a channel 150 arranged perpendicular to the axis X-X of the body, the transverse profile of which channel, in the form of a partial circle, is adapted to receive a conductor 190 provided with a sheath 191 and shown by dashed lines in FIG. 10. The conductor has a small diameter compared with the diameter of a cable.

The channel 150 is arranged on the outer envelope of the casing 5, close to the pin 42 of the retractable cutting blade 40, on either side of a slot 151 in the body 2, in which slot the blade 40 is positioned when it is retracted inside the body.

The arrangement of the channel 150 is such that the cutting or sharp portion 152 (FIG. 9) of the blade 40 interferes in the profile of the channel 150 when the blade 40 is displaced in rotation between a position in which it is extended at least in part and a position in which it is retracted inside said body at least in part (FIG. 9). The cutting edge 152 faces the body 2 and the user cannot position a finger opposite the cutting edge. The safety of the user is thus improved.

In an advantageous manner the outer envelope of the casing 5 also comprises a notch 160 which also extends perpendicular to the axis X-X on either side of the slot 151. The notch 160 is also arranged close to the pin 42 and its concave shape is provided with the channel 150.

The operator uses the notch 160 to grasp the blade 40 between thumb and index finger when said blade is in a retracted position inside the body 2. He can thus easily extract the blade 40 from the casing 5.

To strip the conductor 190, the operator extracts the blade 40 from the body 2, at least in part, allowing full access to the channel, for example in a completely extended position.

He then places the conductor 190 to be stripped in the channel 150 and positions the cutting edge 152 of the blade 40 in contact with the conductor by rotating the blade 40 in relation to the pin 42 in the direction of the arrow d3 in FIG. 9.

The user keeps the conductor 190 clamped between the blade 40 and the channel 150 by exerting a pushing force in the direction of the arrow F5 in FIG. 9 on the back of the blade 40 by means of his thumb, while applying a reaction force by means of his index finger on the face of the casing 5 which is opposite the blade 40.

He then causes one of the tool and the conductor to rotate in relation to the other along the axis of the channel 150 through an angle of approximately 180° in one direction and then in the other.

The sheath 191 of the conductor 190 is cut sufficiently over its circumference to expose the metal core of the conductor over the desired length.

The user thus benefits from a simple and effective arrangement for stripping a conductor of small diameter. This arrangement is applicable to a stripping tool at least provided with a body and a pivoting and retractable cutting blade, such as an electrician's knife.

Owing to the invention, the user can work effectively and quickly to strip a cable. He performs his tasks ergonomically and safely. In addition, he can change the incision knife rapidly without disassembling the tool completely. The tool also makes it possible to strip a conductor easily by means of a retractable cutting blade. Finally, the tool is simple, compact and economical to produce.

The invention claimed is:

1. Tool (1) for stripping electric cables, the tool being of the type comprising:
    a body (2);
    a cable support head (4) connected to the body (2); and
    a knife holder (7) supporting a cable sheath incision knife (8), the cutting portion (9) of the knife (8) being capable of extending beyond the knife holder (7), the knife holder (7) being configured to receive a socket (34) supporting the incision knife (8), and a clip (36) arranged so as to be movable inside the socket (34), the clip (36) being provided with a locking/unlocking opening (136) intended to interact with a groove (102) arranged on the shaft (100) of the knife (8).

2. Tool according to claim 1, wherein the groove (102) is arranged at the end (101) of the knife (8) opposite the cutting portion (9).

3. Tool according to claim 1, wherein the knife holder (7) receives the socket (34) in a sliding manner to adjust the projection height of the knife (8) from the knife holder (7).

4. Tool according to claim 3, wherein the knife holder (7) receives a knob (38) such that said knob can rotate relative to the knife holder (7), which knob is provided with an internal tapping (39) which acts on an external thread (35) of the socket (34) in order to displace it in a sliding manner.

5. Tool according to claim 1, wherein the knife holder (7) defines passages (150a, 150b) which are adapted to provide access to the clip (36) from outside the knife holder (7).

6. Tool according to claim 1, wherein the body (2) extends along a longitudinal axis X-X and further defines a recess (3) delimiting a cable support head (4), the knife holder (7) being received in a sliding manner in relation to the body (2) substantially along the longitudinal axis X-X and including a free end (60) arranged in the recess (3), facing the support head (4), beyond which end the cutting portion (9) of the knife (8) extends; the tool (1) further comprising:
    a biasing means which acts on the knife holder to displace it towards the support head; and
    a gripping means (32) which is rigidly connected to the knife holder (7) for maneuvering it,
    the knife holder (7) being movable between an advanced position in which the incision knife (8) is moved closer to the support head (4) under the action of the biasing means (32) and a retracted position in which the incision knife (8) is moved away from the support head (4) against the action of the biasing means (32),
    the gripping means (22) being arranged adjacent to the free end (60) of the knife holder (7) and comprising a bearing face (62) adapted to receive a cable to be engaged in the support head (4).

7. Tool according to claim 6, wherein the bearing face (62) is oriented in relation to the longitudinal axis X-X such that a force F applied to the cable in a direction substantially transverse to the sliding direction of the knife holder (7) acts on the knife holder (7) with an axial force component $F1x$ capable of displacing the knife holder (7) from its advanced position towards its retracted position against the action R of the biasing means (32).

8. Tool according to claim 6, wherein the gripping means (22) is arranged so as to project laterally, at least in part, from the support head (4), and in that the bearing face (62) is inclined in relation to the longitudinal axis X-X of the body (2), laterally from the end (60) of the knife holder (7) towards the end of the body (2) opposite the head (4), moving away from the longitudinal axis X-X, the inclination being between 45° and 90°.

9. Tool according to claim 1, wherein it further comprises a retractable cutting blade (40), pivotally articulated to the body (2) at the opposite end from the support head (4), the blade (40) being movable between a rest position in which it is closed, retracted inside the body (2), and a working position in which it is open, completely extended from the body (2), and in that the body (2) further comprises a channel (150) which is transverse in relation to the axis X-X and intended to receive an electrical conductor, the cutting portion (152) of the blade (40) interfering in the profile of the channel (150) in order to strip the conductor when the blade (40) is in a virtually closed position.

10. Tool according to claim 9, wherein an opening member (44) locks the blade (40) in a completely open position, extracted from the body (2).

\* \* \* \* \*